United States Patent
Lagnado

(10) Patent No.: US 10,746,554 B2
(45) Date of Patent: Aug. 18, 2020

(54) ADJUSTABLE DATA TRANSMISSIONS BY NAVIGATION DEVICES

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 321 days.

(21) Appl. No.: 15/345,310

(22) Filed: Nov. 7, 2016

(65) Prior Publication Data

US 2017/0052030 A1 Feb. 23, 2017

Related U.S. Application Data

(63) Continuation of application No. 13/816,199, filed as application No. PCT/US2010/046355 on Aug. 23, 2010, now Pat. No. 9,523,579.

(51) Int. Cl.
*G01C 21/00* (2006.01)
*G01C 21/20* (2006.01)
(Continued)

(52) U.S. Cl.
CPC .......... *G01C 21/203* (2013.01); *G01C 21/00* (2013.01); *G01C 21/20* (2013.01); *G01S 5/0027* (2013.01); *G01S 19/09* (2013.01); *G01S 19/34* (2013.01)

(58) Field of Classification Search
None
See application file for complete search history.

(56) References Cited

U.S. PATENT DOCUMENTS

| 3,852,750 A | 12/1974 | Klein |
| 6,192,314 B1 | 2/2001 | Khavakh et al. |

(Continued)

FOREIGN PATENT DOCUMENTS

| CN | 101446635 | 6/2009 |
| CN | 101650867 A | 2/2010 |

(Continued)

OTHER PUBLICATIONS

Lewis et al. "Synchronised Encoding of GPS NMEA Messages onto High Definition Video Streams" (2007) 213-213. 10.1109/IMVIP.2007.32. Also available at https://ieeexplore.ieee.org/document/4318167 (Year: 2007).*

(Continued)

*Primary Examiner* — Todd Melton
*Assistant Examiner* — Jason R Roberson
(74) *Attorney, Agent, or Firm* — HPI Patent Department

(57) ABSTRACT

In some examples, a device receives a dynamically selectable threshold, and responsive to the threshold being set to a first threshold value, causes transmission, to a computer over a communication interface, location data relating to a geographic location of the device at a first frequency of transmission, regardless of whether the device is stationary or in motion. Responsive to the threshold being set to a second threshold value different from the first threshold value, the device causes transmission, to the computer over the communication interface, the location data relating to the geographic location of the device in response to determining that the device has moved by a distance that exceeds the second threshold value.

20 Claims, 3 Drawing Sheets

(51) Int. Cl.
*G01S 19/09* (2010.01)
*G01S 19/34* (2010.01)
*G01S 5/00* (2006.01)

(56) References Cited

U.S. PATENT DOCUMENTS

| | | | |
|---|---|---|---|
| 6,292,745 | B1 | 9/2001 | Robare et al. |
| 6,801,853 | B2 | 10/2004 | Workman |
| 6,803,861 | B2* | 10/2004 | Flick .................. B60R 25/04 340/988 |
| 7,016,687 | B1 | 3/2006 | Holland |
| 2002/0115436 | A1 | 8/2002 | Howell et al. |
| 2006/0229058 | A1* | 10/2006 | Rosenberg ............. H04W 4/02 455/404.2 |
| 2009/0113516 | A1* | 4/2009 | Vorreiter ............. G06F 21/6218 726/1 |
| 2009/0234581 | A1 | 9/2009 | Levy et al. |
| 2009/0248303 | A1 | 10/2009 | Tai |
| 2009/0278738 | A1 | 11/2009 | Gopinath |
| 2010/0077115 | A1 | 3/2010 | Rofougaran |
| 2011/0159884 | A1* | 6/2011 | Chawla ............. H04W 52/0254 455/456.1 |

FOREIGN PATENT DOCUMENTS

| | | |
|---|---|---|
| EP | 1139065 | 3/2001 |
| EP | 2073392 | 6/2009 |
| JP | H10-221426 | 8/1998 |
| JP | 2001-124583 | 11/2001 |
| JP | 2002214321 | 7/2002 |
| JP | 2004-138562 | 5/2004 |
| JP | 2005-033612 | 2/2005 |
| JP | 2005043354 | 2/2005 |
| JP | 2005-098940 | 4/2005 |
| JP | 2007-155493 | 6/2007 |
| JP | 2007312165 | 11/2007 |
| WO | WO-2004/025320 | 3/2004 |

OTHER PUBLICATIONS

EPO—Supplementary Search Report cited in Appl. No. 10856505.2 dated Nov. 4, 2014; 2 pages.
http://www.gpslodge.com/archives/004566.php;GPSLodge.com Internet Ad, Jan. 28, 2006 (1 page).
http://www.ultimate-netbook.co.uk/Universal-Accessories/GPS-USB-Dongle/Navisys-GR-3 Internet Ad, 2010 (1 page).
Japanese Office Action cited in Appl. No. P2013-525871; dated Jul. 22, 2014; 3 pages.
Korean Intellectual Property Office, International Search Report and Written Opinion for PCT/US2010/046355,dated Apr. 27, 2011 (8 pages).
SiRFstarIV Architecture with SiRFaware Technology;2009 SiRF Technology Inc; http://www.sirf.com/products/SiRFstarIV%20Brochure.pdf, Jul. 2009 (2 pages).

* cited by examiner

ADJUSTABLE DATA TRANSMISSIONS BY NAVIGATION DEVICES

CROSS REFERENCE TO RELATED APPLICATIONS

This is a continuation of U.S. application Ser. No. 13/816,199, filed Feb. 8, 2013, which is a national stage application under 35 U.S.C. § 371 of PCT/US2010/046355, filed Aug. 23, 2010, which are both hereby incorporated by reference in their entirety.

BACKGROUND

A navigation device is a location determining device that can provide geographic location information of the device. An example of a navigation device is a global positioning system (GPS) navigation device which can receive GPS signals for the purpose of determining the location of the device. A navigation device may consume power during operation including when calculating its location and transmitting this information to other devices.

BRIEF DESCRIPTION OF THE DRAWINGS

For a detailed description of example embodiments, reference will now be made to the accompanying drawings in which.

DETAILED DESCRIPTION

A navigation device can generate data related to its geographic location and transmit this data to another device such as notebook computer or other computing device. The computing device may consume power when it receives and processes the data. The frequency at which the data is transmitted to the computing device (how often) may have an impact on the power consumption of the computing device. To help reduce such power consumption, in one embodiment, the navigation device can adjust the frequency of transmission of the location data. This can be based on a selectable threshold value representing an amount of change in the location of the device. In this manner, the navigation device can transmit the data when the location of the device changes in an amount that exceeds the threshold value. Therefore, the navigation device can reduce the frequency of transmission of the location data to the computing device which may help decrease the computing device resources (controller and memory) necessary for processing the data thereby reduce the power consumption of the device.

Figure 1:
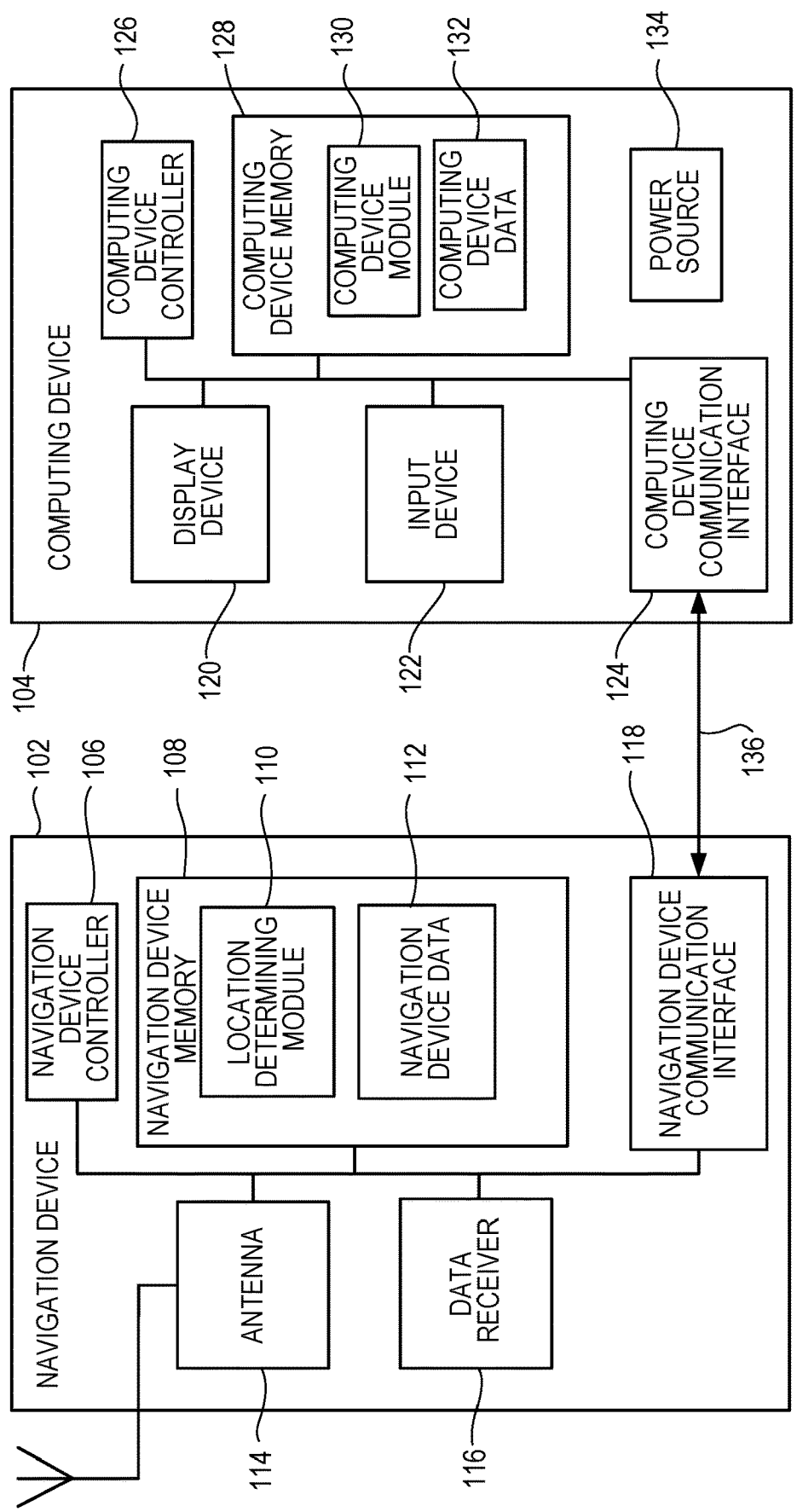
FIG. 1 is a block diagram of a navigation device with adjustable data transmission in accordance with at least some illustrative embodiments.
Figures 2A, 2B:
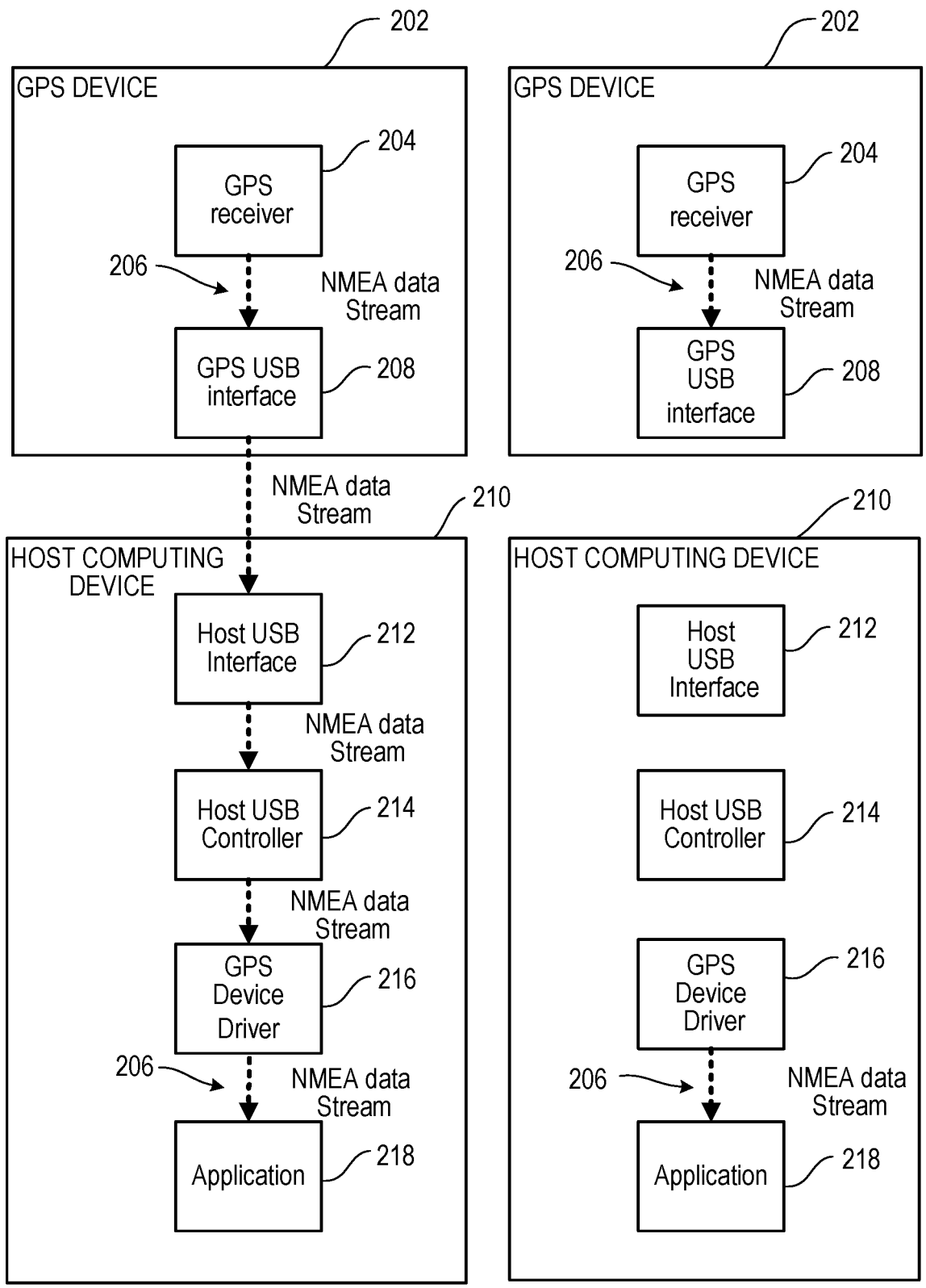
FIGS. 2A and 2B are flow diagrams showing a navigation device communicating with a host computing device in accordance with at least some illustrative embodiments.
Figure 3:
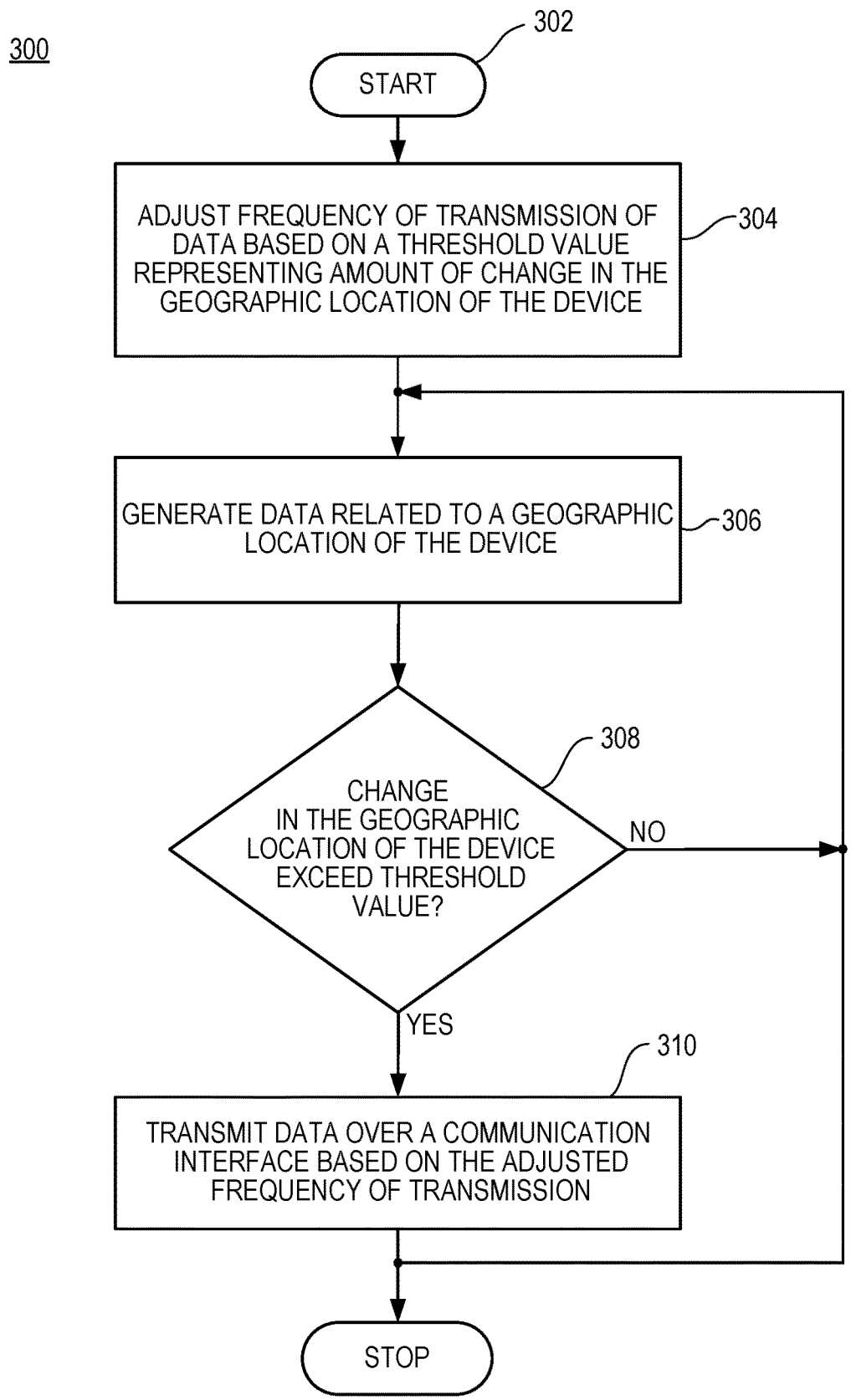
FIG. 3 is a flow chart of a method of operation of the navigation device in accordance with at least some illustrative embodiments.

Various embodiments and the advantages thereof are best understood by referring to FIGS. 1-3 like numerals being used for like and corresponding parts of the various drawings.

FIG. 1 shows a system 100 comprising a navigation device 102 capable of transmitting geographic location data over a communication link 136 to a computing device 104 in accordance with an embodiment. The navigation device 102 can include a location determining module 110 configured to generate data relating to a geographic location of the device 102 and to adjust frequency of transmission of the data to the computing device 104. The adjustment can be based on a selectable threshold value representing an amount of change in the geographic location of the navigation device 102. For example, the module 110 can transmit geographic location data to the computing device 104 based on whether the location of the device has changed by a threshold value such as, for example, 100 feet. By having the device 102 reduce the frequency at which data is transmitted to the computing device 104, the computing device may be able to decrease the amount of resources necessary to process the data and therefore help consume less power. In other words, the frequency of transmission of data can be adjusted to help decrease the power consumption of the computing device. The navigation device 102 can provide a user the ability to adjust the frequency of transmission to allow a desired tradeoff between a level of location data accuracy and power consumption.

The navigation device 102 can include a navigation device controller 106 configured to control the operation of the device. The controller 106 can be a processor or any hardware logic configured to execute computer executable instructions stored in navigation memory 108 and store and retrieve navigation data 112 in memory during the operation of the controller. The navigation data 112 can include geographic location data of the device generated by the navigation device 102 during its operation. The navigation data 112 can also include one or more threshold values representing an amount of change in the geographic location for adjusting the frequency of transmission of data to the computing device. For example, a user can specify a threshold value of a predefined distance, such as 100 feet, representing the amount of distance or change in the location of the device before the navigation device 102 transmits the location data to the computing device. A threshold value can be set by a user through any input means, such as keyboard, on the computing device 104 or navigation device 102, or a combination thereof.

In one embodiment, the location determining module 110 can generate and transmit geographic location data in accordance with the United States based national marine electronics association (NMEA) standard. The NMEA standard is a combined electrical and data specification for a marine data network for communication between marine electronic devices including GPS receivers or other navigation devices. The module 110 can transmit the location data to the computing device 104 in a continuous stream at a particular frequency of transmission such as 1 Hertz. Such a continuous stream of data may increase the power consumption of the computing device because it has to allocate resources, such as the controller and memory, to process the received location data even when there is no change in the location of the device.

In one embodiment, the location determining module 110 can adjust the frequency at which location data is transmitted over the communication link 136 to the computing device 104 which may help reduce the power consumption of the computing device. For example, the navigation system 102 (and/or computing device 104) can provide a user with the ability to input a plurality of threshold values. For instance, a user can specify that the navigation device 102 is to transmit (or sometimes referred to as stream) location data to the computing device at the standard rate of 1 Hz. That is, the threshold value is zero meaning that the data is transmitted at the standard rate or frequency of transmission. This may provide for the highest accuracy location data but at the cost of increased power consumption because the computing device has to process data at the 1 Hz rate. That is, location data may be transmitted even when there is no change in the location of the navigation device. In another example, a user can specify that location data is to be transmitted only when a specified amount of change in the location of the device occurs. That is, when the location of the navigation device 102 is static (not changing location), the device can store (or buffer) the current location data in memory and the device does not transmit any data to the computing device. If the location determining module 110 determines that a change in its location has occurred, it can then transmit the location data to the computing device over the communication link 136. This may provide for adequate accuracy of location data and improved power consumption. In yet another, example, a user can specify a threshold value representing an amount of change in the geographic location of the device such that data is transmitted only when the change in the location of the device exceeds the threshold value. This may provide for the least accuracy of location data but a further reduction in power consumption.

The location determining module 110 can be a software module comprising computer executable instructions in the memory 108. However, it should be understood that the module 110 can be a hardware module comprising logic configured to perform similar functions as a software implemented module. In another embodiment, the module 110 can be a combination of hardware and software components. The navigation memory 108 can comprise a computer-readable medium such as volatile memory (e.g., random access memory, etc.), non-volatile storage (e.g., read only memory, Flash memory, CD ROM, etc.), and combinations thereof. The memory 108 can comprise additional software or firmware that can be executed by the controller 106. One or more of the actions described herein are performed by the controller 106 during execution of the software or firmware.

The navigation device 102 can include an antenna 114 for receipt of navigation signals from an external navigation data providing system. The device 102 can include a data receiver 116 to process the received navigation signals for use by the location determining module 110 to determine the geographic location of the device. The navigation signals can be sent from a global positioning system (GPS) system, a terrestrial-based system, a satellite-based system or any other system that can provide signals to determine a location of a device. In a GPS embodiment, each satellite may continually transmit messages that may include the time the message was transmitted, precise orbital information (the ephemeris), the general system health and rough orbits of all GPS satellites (the almanac) and other information as necessary. The navigation device 102 may use the messages it receives to determine the transit time of each message and compute the distances to each satellite. The location determining module 110 can use these distances along with the satellites' locations with the possible aid of trilateration, depending on which algorithm is used, to compute the location of the navigation device 102.

The navigation device 102 can be configured to communicate with the computing device 104 over the communication link 136. The navigation device 102 can include a navigation communication interface 118 and the computing device 104 can include a communication interface 124 to allow for the exchange of data between each device. The communication means (communication interfaces 118, 124 and communication link 136) can be any means of communication such as wired means of communication (using a cable), wireless means of communication (such as Bluetooth) or a combination thereof. For example, the communication means can be implemented using universal serial bus (USB) with a serial communications protocol. The computing device 104 can deliver power from power source 134 to the navigation device 102 via the USB interface. However, it should be understood that the navigation device 102 can be powered from a power source other than from power from the computing device 104. For example, the navigation device 102 can be powered from an external power source such as an alternating current (AC) power adapter to convert AC power to direct current (DC) power, a battery or another power source.

The computing device 104 can include a computing device controller 126 to control the operation of the device. The controller 126 can be a processor or any hardware logic configured to execute computer executable instructions in computing device memory 128 and store and retrieve computing device data 132 in the memory during the operation of the controller. The data 132 can include geographic location data of the device received from the navigation device 102 during its operation. The computing device 104 can include a computing device module 130 configured to control the operation of the device. The module 130 can be a software module comprising computer executable instructions in the memory 128. However, it should be understood that the module 130 can be a hardware module comprising logic configured to perform similar functions as a software implemented module. In another embodiment, the module 130 can be a combination of hardware and software components. The memory 128 can comprise a computer-readable medium such as volatile memory (e.g., random access memory, etc.), non-volatile storage (e.g., read only memory, Flash memory, CD ROM, etc.), and combinations thereof. The memory 128 can comprise additional software or firmware that can be executed by the controller 126. One or more of the actions described herein are performed by the controller 126 during execution of the software or firmware.

The computing device 104 can consume power when receiving location data from the navigation device 102 over the communication link 136. The higher the frequency at which data is transmitted from the navigation device 102, the higher the rate at which the computing device 104 has to allocate resources necessary to process the data which may cause an increase in power consumption. On the other hand, the lower the frequency at which data is transmitted from the navigation device 102, the lower the amount of computing device resources necessary to process the data which may cause a decrease in power consumption of the computing device. Accordingly, if the power source is, for example, a battery, then the amount of time before the battery needs to be recharged may depend on the frequency of the data transmitted from the navigation device. The higher the frequency at which data is transmitted, the higher the power consumption which may cause the battery to be recharged at a higher rate. As explained above, adjusting the frequency at which data is transmitted presents a tradeoff between accuracy of location data and power consumption.

The power source 134 can be used to power the computing device 104. The power source can be any means of providing power such as a rechargeable battery, a DC power source such as from an AC adapter to convert an AC source to the DC source, solar power, wind power, fuel cell or any other means of providing power. The power source 134 can be configured to provide power to the navigation device 102 through the communication link 136.

The computing device 104 can include a display device 120 configured to display data or information related to the operation of the device 104 or for any other purpose. The display device 120 can be any means of communicating information or data to the user. For example, the display device 120 can be a liquid crystal display (LCD), light emitting device (LED) display, sound output, mechanical/ vibration output or a combination thereof. The computing device 104 can include an input device 122 configured to allow input of information or data into the device 104 for use in the operation of the device or for any purpose. The input device 122 can be any means of entering information and data to the device. For example, the input device 122 can include a keyboard, mechanical switches, a mouse, a joystick a touch pad, touch screen, voice recognition or a combination thereof. Although not shown, the computing device 104 can include a network communication means to provide wired or wireless access to a communication network.

The navigation device 102 and the computing device 104 can take any shape or form. For instance, the components of the devices 102, 104 can be integrated into a single device, printed circuit board, housing or the like. The components of the devices 102, 104 can also be detachable or separate from each other and can use any means of communication between each component. In one embodiment, the devices 102, 104 can be integrated into a single housing in the form of a notebook computer with a base component having an input device and a display component having a display device. In other embodiments, the devices 102, 104 can take other forms and shapes such as a netbook, a GPS receiver device, tablet computer, client computer, server computer, desktop computer, rack mount computer, smartphone, cellphone, e-reader or any other electronic device capable of performing functions in an electronic form.

FIGS. 2A and 2B are flow diagrams showing a navigation device communicating with a host computing device in accordance with an embodiment.

FIG. 2A shows a GPS device 202 configured to communicate with a host computing device 210. The GPS device 202 can be a navigation device having a GPS receiver 204 configured to receive GPS signals from an external GPS source and generate geographic location data based on the GPS signals. The GPS device 202 can generate and transmit data representing a geographic location of the device as a NMEA data stream 206 in accordance with the NMEA transmission standard across USB interface 208 and to the host computing device 210. The host computing device 210 includes a host USB controller 214 configured to control the operation of the device and of host USB interface 212 to receive the NMEA data stream 206 from the GPS device 202. The host computing device 210 includes a GPS device driver 216 (sometimes referred to as software driver) which can be a computer program configured to allow application program 218 to interact with hardware level functions of the device 210 such as, for example, the host USB interface 212 and the host USB controller 214. The application 218 can be a computer program configured to use the data stream 206 provided by the GPS device driver 216. For example, the application 218 can include GPS based functions such as mapping, driving or a combination thereof. FIG. 2A shows the GPS device 202 in a mode of operation in which it is transmitting to the host computing device 210 a constant data stream 206 which is being used by the application 218. However, it may be desirable for the application 218 to receive data stream 206 even when the GPS device 202 is in a physical static state (i.e., not moving) and not generating a data stream, as described in further detail below.

FIG. 2B shows an embodiment in which the application 218 can receive the data stream 206 even when the GPS device 202 is not transmitting the data stream across the interface 208. For example, when GPS device 202 is in a physical static state (i.e., not moving) or within a specified threshold value as described above, the GPS device may generate a data stream 206 but it may not transmit the stream across the interface 208. However, the application 218 may require data stream 206 for proper operation even when it is not being transmitted by the GPS device 202. For example, the application 218 may require that the data stream 206 be constant (NMEA data stream at 1 Hz) as an indicator that the GPS device 202 is still functioning and providing valid data. In one embodiment, the device driver 216 can be configured to provide a constant data stream 206 to continue to flow from the device driver to the application 218, even when the GPS device 202 is not transmitting the data stream. This may occur when the GPS device 202 uses a threshold value to reduce the frequency at which it transmits data thereby causing the communication link itself to be throttled down and improve power consumption. In one embodiment, the device driver 216 can be configured to provide data stream 206 based on the last location data or information that it received from the GPS device 202. The device driver 216 can update data stream 206 when it receives a new GPS location. In this manner, the host computing device 210 can be power efficient by allowing a reduction in the frequency at which GPS data is transmitted across the communication link, while allowing application 218 to benefit from a constant GPS data stream.

FIG. 3 shows a flow diagram of a method 300 of transmitting geographic location data from the navigation device 102 to the computing device 104 in accordance with an embodiment. Though depicted sequentially as a matter of convenience, at least some of the actions shown can be performed in a different order and/or performed in parallel. Additionally, some embodiments may perform only some of the actions shown. In the embodiment illustrated in FIG. 3, the method 300 begins at block 302 which may include a process of establishing communication between the navigation device 102 and the computing device 104. The devices 102, 104 can be coupled to each other using a communication link 136 with respective communication interfaces 118, 124. Once the power source 134 of the computing device 104 is operational, it can be used to provide power to the computing device 104 and to the navigation device 102 over the communication link 136.

At block 304, the navigation device 102 can adjust the frequency of transmission of data from the navigation device 102 to the computing device 104. For example, the location determining module 110 can provide this adjustment function based on a threshold value representing amount of change in geographic location of the navigation device 102. For example, a user can specify a threshold value using the input device 122 to enter a particular value. The threshold value can be communicated to the location determining module 110 which can use the value to adjust the frequency of transmission of data from the navigation device 102 to the computing device 104. As explained above, the module 110 can use the threshold value to determine the frequency at which to transmit data to the computing device 104. For example, a large threshold value may cause the navigation device 102 to decrease that frequency at which it transmits data to the computing device. This may cause a decrease in the accuracy of the location data but a decrease in the power consumption of the computing device 104. On the other hand, a small threshold value may cause the navigation device 102 to increase the frequency at which it transmits data to the computing device 104. This may cause an increase in the accuracy of the location data but an increase in the power consumption of the computing device. In any event, the user is provided with the ability to select or specify one or more threshold values depending on the desired results or tradeoff between accuracy and power consumption.

At block 306, the navigation device 102 can generate data related to the geographic location of the navigation device. For example, the location determining module 110 can receive GPS navigation data from a GPS navigation system. The module 110 can use this navigation data to calculate data representing the geographic location of the device. It can store or buffer the generated location data in the navigation memory 108 for subsequent processing such as calculating a change in the location of the device, as described below. The operation of the navigation device 102 proceeds to block 308.

At block 308, the navigation device 102 can check whether a change in the geographic location of the device exceeds the specified threshold value. For example, location determining module 110 can compare a calculated current location data value with a previous calculated location data value to determine whether a change in the location of the device occurred. The module 110 can check if the difference in the current location value and the previous location value exceeds the threshold value.

If the change in the geographic location exceeds the threshold value, then the navigation device 102 proceeds processing to block 310. At block 310, the device 102 transmits the location data to the computing device 104 over the communication link. For example, the location determining module 110 can retrieve location data from the memory 108 and transmit to the computing device 104 a plurality of data values representing one or more location values. As explained above, the user can specify threshold values to provide increased accuracy or low power consumption. Once the navigation device 102 has completed transmitting data to the computing device, processing proceeds to block 306. At block 306, as explained above, the device 102 continues to generate data related to the geographic location of the navigation device. The device 102 stores the data for subsequent processing.

If the change in the geographic location does not exceed the specified threshold value, then the navigation device 102 proceeds processing to block 306. At block 306, as explained above, the device 102 continues to generate data related to the geographic location of the navigation device. The device 102 stores the data for subsequent processing.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device comprising:
    a communication interface;
    a processor;
    a non-transitory storage medium storing instructions executable on the processor to:
        receive a selectable threshold representing an amount of change in a geographic location of the device, the threshold settable to different threshold values to adjust power consumption of a power source for the device;
        at a first time when the threshold is set to a first threshold value representing a first amount of change in the geographic location of the device, cause transmission, to a computer over the communication interface, location data relating to the geographic location of the device at a first non-zero frequency of transmission, even when the device is stationary, the causing of the transmission of the location data at the first non-zero frequency of transmission being responsive to the threshold being set to the first threshold value; and
        at a second time when the threshold is set to a second threshold value different from the first threshold value, cause transmission, to the computer over the communication interface, the location data relating to the geographic location of the device in response to determining that the device has moved by a distance that exceeds the second threshold value, the second threshold value representing a second amount of change in the geographic location of the device, and the causing of the transmission of the location data in response to determining that the device has moved by the distance that exceeds the second threshold value being responsive to the threshold being set to the second threshold value.

2. The device of claim 1, wherein the communication interface is a wired interface.

3. The device of claim 1, wherein the communication interface is a Universal Serial Bus (USB) interface.

4. The device of claim 1, wherein the communication interface is a wireless interface.

5. The device of claim 1, wherein the power source for the device comprises power received over the communication interface from the computer.

6. The device of claim 1, wherein the instructions are executable on the processor to:
    responsive to the threshold being set to a third threshold value larger than the second threshold value, cause transmission, to the computer over the communication interface, the location data relating to the geographic location of the device in response to determining that the device has moved by a distance that exceeds the third threshold value.

7. The device of claim 1, wherein the instructions are executable on the processor to determine the location data based on data received from a terrestrial-based system or a satellite-based system.

8. The device of claim 1, further comprising a user input device to receive user input to set a value of the received selectable threshold.

9. The device of claim 1, wherein the instructions are executable on the processor to:
    at the second time when the threshold is set to the second threshold value, decline to transmit, to the computer, the location data relating to the geographic location of the device in response to determining that the device has moved by a distance that does not exceed the second threshold value.

10. A method comprising:
    generating, by a device comprising a processor and a communication interface, location data relating to a geographic location of the device;
    receiving, by the device, a selectable threshold representing an amount of change in the geographic location of the device, the threshold settable to different threshold values to adjust power consumption of a power source for the device;

at a first time when the threshold is set to a first threshold value representing a first amount of change in the geographic location of the device, transmitting, by the device to a computer over the communication interface, the location data relating to the geographic location of the device at a first non-zero frequency of transmission, even when the device is stationary, the transmitting of the location data at the first non-zero frequency of transmission being responsive to the threshold being set to the first threshold value; and at a second time when the threshold is set to a second threshold value different from the first threshold value, transmitting, by the device to the computer over the communication interface, the location data relating to the geographic location of the device in response to determining that the device has moved by a distance that exceeds the second threshold value, the second threshold value representing a second amount of change in the geographic location of the device, and the transmitting of the location data in response to determining that the device has moved by the distance that exceeds the second threshold value being responsive to the threshold being set to the second threshold value.

11. The method of claim 10, further comprising:

at the second time when the threshold is set to the second threshold value, declining to transmit, by the device to the computer over the communication interface, the location data relating to the geographic location of the device in response to determining that the device has moved by a distance that does not exceed the second threshold value.

12. The method of claim 11, further comprising:

during a time interval during which the device is not transmitting the location data to the computer, transmitting, by a device driver in the computer, location data relating to the device to an application in the computer.

13. The method of claim 12, wherein the device driver transmits the location data relating to the device to the application to provide an indication to the application that the device is functioning.

14. The method of claim 12, further comprising:

transmitting, by the device driver to the application, the location data relating to the device at the first non-zero frequency even though, during the time interval, the computer does not receive the location data relating to the geographic location of the device from the device over the communication interface.

15. The method of claim 12, wherein the location data relating to the device transmitted by the device driver to the application comprises a data stream.

16. The method of claim 10, wherein generating the location data is based on data from a terrestrial-based system or a satellite-based system.

17. A non-transitory computer-readable medium comprising instructions that when executed cause a device to:

receive a selectable threshold representing an amount of change in a geographic location of the device, the threshold settable to different threshold values to adjust power consumption of a power source for the device;

at a first time when the threshold is set to a first threshold value representing a first amount of change in the geographic location of the device, cause transmission, to a computer over a communication interface of the device, location data relating to the geographic location of the device at a first non-zero frequency of transmission, even when the device is stationary, the causing of the transmission of the location data at the first non-zero frequency of transmission being responsive to the threshold being set to the first threshold value; and at a second time when the threshold is set to a second threshold value different from the first threshold value, cause transmission, to the computer over the communication interface, the location data relating to the geographic location of the device in response to determining that the device has moved by a distance that exceeds the second threshold value, the second threshold value representing a second amount of change in the geographic location of the device, and the causing of the transmission of the location data in response to determining that the device has moved by the distance that exceeds the second threshold value being responsive to the threshold being set to the second threshold value.

18. The non-transitory computer-readable medium of claim 17, wherein the power source for the device comprises power received over the communication interface from the computer.

19. The non-transitory computer-readable medium of claim 17, wherein the instructions when executed cause the device to determine the location data based on data received from a terrestrial-based system or a satellite-based system.

20. The non-transitory computer-readable medium of claim 17, wherein the instructions when executed cause the device to:

at the second time when the threshold is set to the second threshold value, decline to transmit, to the computer, the location data relating to the geographic location of the device in response to determining that the device has moved by a distance that does not exceed the second threshold value.

* * * * *